United States Patent
Sanchez et al.

(10) Patent No.: US 8,784,646 B2
(45) Date of Patent: *Jul. 22, 2014

(54) RESIDUE CONVERSION PROCESS THAT INCLUDES A DEASPHALTING STAGE AND A HYDROCONVERSION STAGE WITH RECYCLING OF DEASPHALTED OIL

(75) Inventors: Eric Sanchez, Saint Genis Laval (FR); Jan Verstraete, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 190 days.

This patent is subject to a terminal disclaimer.

(21) Appl. No.: 13/226,582

(22) Filed: Sep. 7, 2011

(65) Prior Publication Data

US 2012/0061292 A1 Mar. 15, 2012

(30) Foreign Application Priority Data

Sep. 7, 2010 (FR) .................................. 10 03561
Sep. 28, 2010 (FR) .................................. 10 03836

(51) Int. Cl.
| | | |
|---|---|---|
| *C10G 67/00* | (2006.01) | |
| *C10G 67/02* | (2006.01) | |
| *C10G 67/04* | (2006.01) | |
| *C10G 47/00* | (2006.01) | |
| *C10G 49/10* | (2006.01) | |

(52) U.S. Cl.
USPC .................. 208/58; 208/49; 208/95; 208/108; 208/209

(58) Field of Classification Search
USPC ........... 208/46, 49, 58, 95, 96, 106, 107, 108, 208/111.35, 208 R, 209, 251 R, 251 H, 254 R, 208/254 H See application file for complete search history.

(56) References Cited

U.S. PATENT DOCUMENTS

| 3,887,455 A * | 6/1975 | Hamner et al. ............... 208/112 |
| 4,591,426 A | 5/1986 | Krasuk et al. |
| 5,980,730 A | 11/1999 | Morel et al. |
| 6,017,441 A | 1/2000 | Morel et al. |

FOREIGN PATENT DOCUMENTS

| FR | 2 753 982 A1 | 4/2003 |
| FR | 2 753 984 A1 | 4/2003 |

OTHER PUBLICATIONS

Tailleur, R, Effect of recycling the unconverted residue on a hydrocracking catalyst in an ebullated bed reactor, Fuel Processsing Technology, 2007, vol. 88, Elsevier, p. 779-785.*
Parkash, S, Refining Processes Handbook, 2003, Gulf Publishing, p. 1-61.*
Search Report, dated Mar. 30, 2011, in corresponding FR 10/03.836.

* cited by examiner

*Primary Examiner* — Walter D Griffin
*Assistant Examiner* — Derek Mueller
(74) *Attorney, Agent, or Firm* — Millen, White, Zelano & Branigan, P.C.

(57) ABSTRACT

For conversion of crude oil or a heavy hydrocarbon fraction having an initial boiling point of at least 300° C., conducting a catalytic hydroconversion in a three-phase reactor operating in a boiling bed with an upward flow of liquid and gas, separating resultant effluent into a light liquid fraction boiling at less than 300° C. and a heavy liquid fraction boiling above 300° C., deasphalting the heavy liquid fraction to obtain a deasphalted hydrocarbon fraction and residual asphalt, and recycling at least one portion of the deasphalted hydrocarbon fraction upstream of the hydroconversion stage.

13 Claims, 3 Drawing Sheets

RESIDUE CONVERSION PROCESS THAT INCLUDES A DEASPHALTING STAGE AND A HYDROCONVERSION STAGE WITH RECYCLING OF DEASPHALTED OIL

The invention relates to the refining and conversion of crude oil or the heavy hydrocarbon fraction that is obtained from atmospheric and/or vacuum distillation of a crude oil and in particular of the residue type having an initial boiling point of at least 300° C. and containing, i.a., sulfur-containing and nitrogen-containing impurities. It relates more particularly to a process that makes it possible to convert—at least partially—a hydrocarbon feedstock, such as, for example, a vacuum residue that is obtained by atmospheric distillation followed by a vacuum distillation of a crude oil. More particularly, the invention relates to the processes with a boiling bed technology and a deasphalting technology. Such processes have already been extensively exploited industrially.

The upgrading of these petroleum residues is relatively difficult. Actually, the market is primarily a demander of fuels, distillable at atmospheric pressure at a temperature that is less than 320-380° C. The crude oils are characterized by variable contents of atmospheric residues that depend on the origin of the treated crudes. This content generally varies between 20 and 50% for the conventional crudes, but it can reach 50 to 80% for the heavy and extra-heavy crudes, such as, for example, those produced in Venezuela or in the Athabasca region in northern Canada. It is therefore necessary to convert these residues by breaking the heavy molecules of residues for producing smaller molecules by cracking.

More specifically, the feedstocks that are treated within the framework of this invention are either crude oils or heavy hydrocarbon fractions that are obtained from the distillation of a crude oil and that have an initial boiling point of at least 300° C. and preferably vacuum residues. These feedstocks are generally hydrocarbon fractions that have a sulfur content of at least 0.5%, preferably at least 1%, and in a preferred manner at least 2% by weight, a content of Conradson carbon of at least 5% by weight, and preferably at least 10% by weight, a content of C7 asphaltenes of at least 1% by weight, and preferably at least 5% by weight, and a content of metals of at least 20 ppm, and preferably at least 100 ppm.

One of the objectives of the invention is to provide a conversion process that includes stages of hydroconversion and deasphalting within the same reaction section, thus enhancing the thermal integration by optimizing the network of exchangers and reducing both the initial investment of the concatenation by reducing the number of pieces of equipment that are necessary as well as the operating expenses.

Another objective of the invention is to provide a conversion process making it possible, by the implementation of a recycling of the deasphalted hydrocarbon fraction (DAO) that is obtained, to achieve a net conversion of the residual fraction that is greater than 85% and preferably greater than 90%.

PRIOR ART

The technologies for boiling bed residue hydroconversion are known. For example, the H-oil technology licensed by Axens and the LC-Fining technology licensed by Chevron-Lummus-Global, described in numerous documents, can be cited.

The boiling bed technologies use supported catalysts in the form of extrudates whose diameter is on the order of 1 mm. The catalysts remain inside the reactors and are not evacuated with the products. The temperature levels are high so as to obtain high conversions while minimizing the quantities of catalysts that are used. The process requires a low hydrogen coverage rate (hydrogen/feedstock ratio). The catalytic activity can be kept constant using the on-line replacement of the catalyst. Therefore, it is not necessary either to shut down the unit to change the used catalyst, or to increase the reaction temperatures throughout the cycle to compensate for deactivation. In addition, the fact of working under constant operating conditions makes it possible to obtain constant yields and qualities of products throughout the cycle. Also, because the stifling of the catalyst is maintained by a significant recycling of liquid, the pressure drop on the reactor is low and constant, and the reaction exotherms are quickly averaged out over the catalytic bed, which is therefore nearly isothermal and does not require the injection of quenches. A specific feature of the boiling bed process is that the unconverted vacuum residue has a relatively low viscosity and can therefore be recovered in liquid form.

However, the level of conversion of the boiling bed technologies is generally limited to levels that are lower than 80% because of the catalytic system that is employed, the design of the unit, and the stability of the products that are formed.

Certain schemes for conversion of conventional residues of the prior art comprise a deasphalting (SDA), followed by a boiling bed hydroconversion stage as in the patent application WO-04/74408. The state of the art shows that these two known processes are successively implemented in series. Actually, in the residue conversion schemes combining an SDA unit with a fixed bed or boiling bed hydroconversion unit, as appropriate, the SDA unit can be placed upstream along the indirect path or downstream from the hydroconversion process along the direct path. The patents FR 2776297 and U.S. Pat. No. 7,214,308 describe these two possible conversion scheme types.

More specifically, an advanced residue conversion scheme generally combines two successive unit stages: a hydroconversion stage and a deasphalting stage, an intermediate atmospheric distillation stage, and optionally an intermediate vacuum distillation stage being implemented between these two unit stages. Actually, the residue can be treated at least partially in a hydroconversion section in the presence of hydrogen, with said section comprising at least one three-phase reactor that contains a boiling bed hydroconversion catalyst that operates with an upward flow of liquid and gas. This or these reactors comprise at least one means for drawing off catalyst and at least one fresh catalyst make-up means. The conditions that are applied in the hydroconversion reaction section make it possible to obtain a liquid effluent with a reduced content of Conradson carbon, metals and sulfur. The hydroconverted liquid effluent is then sent into an atmospheric distillation zone and intermediate vacuum distillation zone following which atmospheric distillate fractions, one or more vacuum distillate fractions, and a vacuum residue fraction are recovered.

The vacuum residue that is obtained from the distillation zone is next advantageously sent into a deasphalting section in which it is treated in an extractor using a solvent under deasphalting conditions that are known to one skilled in the art, making it possible to obtain a deasphalted hydrocarbon fraction, called DAO, and residual asphalt.

The deasphalting operation (SDA) with solvent is advantageously implemented under conditions that are well known to one skilled in the art: it thus is possible to refer to the article by Billon and others published in 1994 in Volume 49, No. 5 of the journal of the French Petroleum Institute, pages 495 to 507, in the book "Raffinage et conversion des produits lourds du pétrole [Refining and Conversion of Heavy Petroleum Products]" by J. F. Le Page, S. G. Chatila, and M. Davidson, Edition Technip, pages 17-32, or in the U.S. Pat. No. 4,715, 946. The deasphalting can advantageously be done in a mixer-decanter or in an extraction column. The solvent that is used for the deasphalting preferably is a paraffinic solvent and in a preferred manner is heavier than propane. The preferred solvents comprise propane-butane mixtures, butane, pentane, hexane, heptane, light gasoline as well as the mixtures that are obtained from the above-mentioned solvents. The solvent is advantageously recovered by evaporation or distillation or by the opticritical process, i.e., under supercritical conditions relative to the solvent, but not supercritical relative to the solvent-feedstock mixture.

The deasphalted hydrocarbon fraction (DAO) that is thus obtained and, after mixing with at least one portion of the vacuum distillate, called VGO, obtained from the distillation zone, next undergoes a post-treatment under conditions that make it possible to reduce in particular its content of metals, sulfur, nitrogen and Conradson carbon and to obtain—after a new separation by distillation—a gaseous fraction, an atmospheric distillate that it is possible to split into a gasoline and gas oil fraction that is next sent to the fuel pool and a heavier hydrotreated fraction.

Furthermore, the U.S. Pat. No. 3,905,892 describes a process for treating a heavy hydrocarbon feedstock that contains sulfur and of which 95% ends at a temperature that is greater than 524° C., whereby said process comprises an H-oil-type boiling bed hydroconversion stage, a fractionation into three fractions, a 343° C.– light fraction, a 343-524° C. intermediate fraction, and a 524° C.+ heavy fraction, whereby said heavy fraction is next sent into a deasphalting unit for obtaining a deasphalted oil that can be recycled upstream from the hydroconversion stage, in the H-Oil unit.

This invention proposes enhancing this type of concatenation comprising two unit processes for hydroconversion and deasphalting, separated by an atmospheric and intermediate vacuum distillation stage, by proposing a new process that includes said hydroconversion stages using the boiling bed and deasphalting technology using the liquid-liquid extraction technology, within the same unit reaction section, without an atmospheric and intermediate vacuum distillation stage, and with an implementation of a recycling of at least one portion of the deasphalted hydrocarbon fraction (DAO) that is obtained, upstream from the hydroconversion reaction section, so as to reach a net conversion of the residual fraction that is greater than 85% and preferably greater than 90%.

This advanced scheme makes it possible in particular to enhance the vacuum distillate yield (DSV) as well as to reduce the initial investment and the operating cost of the process, in terms of consumption of fluxing agent necessary for conveying the asphalt. It further makes it necessary to enhance the quality of the products that are obtained, more particularly in terms of nitrogen and sulfur of the hydrotreated heavy fraction.

SUMMARY OF THE INVENTION

This invention describes a process for conversion of crude oil or of the heavy hydrocarbon fraction that is obtained from atmospheric and/or vacuum distillation of a crude oil and that has an initial boiling point of at least 300° C. in which said process comprises the following stages:

a) Hydroconversion of at least one portion of said feedstock in the presence of hydrogen in at least one three-phase reactor, whereby said reactor contains at least one hydroconversion catalyst and operates in a boiling bed, with an upward flow of liquid and gas and that comprises at least one means for drawing off said catalyst outside of said reactor and at least one fresh catalyst make-up means in said reactor, under conditions that make it possible to obtain a liquid feedstock with a reduced content of Conradson carbon, metals, sulfur and nitrogen, b) Separation of the effluent that is obtained from stage a) for obtaining a light liquid fraction that boils at a temperature that is less than 300° C. and a heavy liquid fraction that boils at a temperature that is greater than 300° C., c) Deasphalting of at least one portion of the heavy liquid fraction that boils at a temperature that is greater than 300° C. that is obtained from stage b) for obtaining a deasphalted hydrocarbon fraction (DAO) and residual asphalt, d) Recycling of at least one portion of said deasphalted hydrocarbon fraction (DAO) that is obtained from stage c) and mixing with said feedstock upstream from the hydroconversion stage a).

This new scheme is differentiated from the conventional concatenation scheme mentioned above by the fact that the effluent of the boiling bed hydroconversion reaction section is directly treated in a deasphalting unit after a simple separation of the light fraction that boils at a temperature that is less than 300° C., whereby the heavy liquid effluent that boils at a temperature that is greater than 300° C. is brought into contact with a solvent under conditions that make it possible to obtain a deasphalted hydrocarbon fraction and residual asphalt, with the deasphalted hydrocarbon fraction being recycled upstream from the hydroconversion stage a).

This invention therefore has the objective of providing a heavy hydrocarbon conversion process for the production of gasoline fractions and middle distillates with a simpler and more economical process, with improved yields while maintaining good qualities of products. The recycling of at least one portion of the deasphalted hydrocarbon fraction upstream from the hydroconversion stage a) makes it possible to reach a net conversion of the residual fraction that is greater than 85%, and preferably greater than 90%, whereby this conversion level cannot be reached by using conventional boiling bed technologies.

Actually, the deasphalted hydrocarbon fraction DAO that is obtained by the process according to the invention contains no or very few C7 asphaltenes, compounds that are known for inhibiting the conversion of residual fractions, both by their ability to form heavy hydrocarbon residues, commonly called coke, and by their tendency to produce sediments that greatly limit the operability of the hydrotreatment and hydroconversion units.

Thus, the mixture of the recycling of said hydrocarbon fraction DAO and the feedstock that is treated in the process according to the invention makes it possible to supply the hydroconversion stage a) with a feedstock that has a reduced C7 asphaltene content relative to a hydroconversion unit without recycling the deasphalted hydrocarbon fraction DAO. As a result, it is possible to impose stricter operating conditions and thus to reach greater conversion levels of the residual fraction.

By recycling at least a part and preferably the entire deasphalted hydrocarbon fraction DAO that is obtained from stage c), the process according to the invention can, in certain embodiments that will be presented in detail below, make it possible to reach a conversion that is greater than 85%, and preferably greater than 90%.

The net conversion is defined as being the ratio (% by weight of residue in the feedstock–% by weight of residue in the product)/(% by weight of residue in the feedstock) for the same feedstock-product fraction point; typically, this fraction point is between 450 and 550° C. and often approximately 540° C.– in this definition, the residue being the fraction boiling from this fraction point, for example, the 540° C.+ fraction.

This invention also has the objective of providing a heavy hydrocarbon conversion process that makes it possible to produce an easily transportable asphalt. Actually, so as to be able to transport the asphalt, it is necessary to reduce very significantly the viscosity of this fraction. To do this, an aromatic fraction called a fluxing agent is generally added. Among the fluxing agents, the gas oil fraction LCO that is obtained from a catalytic cracking unit is the most used. One of the advantages of this invention is to make possible the production of an asphalt that requires only a decreased use of fluxing agent for its transport.

DETAILED DESCRIPTION OF THE INVENTION

According to stage a) of the process according to the invention, the feedstock that consists of a crude oil or the fraction that is obtained from atmospheric and/or vacuum distillation of a crude oil undergoes a hydroconversion stage a) of at least one portion of said feedstock in the presence of hydrogen in at least one three-phase reactor, whereby said reactor contains at least one hydroconversion catalyst and operates in a boiling bed, with an upward flow of liquid and gas and comprising at least one means for drawing off said catalyst outside of said reactor and at least one fresh catalyst make-up means in said reactor, under conditions that make it possible to obtain a liquid feedstock with a reduced content of Conradson carbon, metals, sulfur and nitrogen.

According to stage d) of the process according to the invention, at least one portion of said deasphalted hydrocarbon fraction (DAO) that is obtained from stage c) is added to said feedstock upstream from the hydroconversion stage a).

The feedstocks that are treated within the framework of this invention consist of a crude oil or the fraction that is obtained from the atmospheric and/or vacuum distillation of a crude oil, with said feedstocks having a boiling point of at least 300° C. and preferably vacuum residues. These feedstocks are generally hydrocarbon fractions that preferably have a sulfur content of at least 0.5%, preferably at least 1%, and in a preferred manner at least 2% by weight, a content of Conradson carbon of at least 5% by weight and preferably at least 10% by weight, a content of C7 asphaltenes of at least 1% by weight and preferably at least 5% by weight, and a content of metals of at least 20 ppm, and preferably at least 100 ppm.

In the case where the feedstock that is treated in the process according to the invention is a crude oil, said process does not comprise an atmospheric and/or vacuum distillation stage prior to the hydroconversion stage a); the crude oil feedstock is sent directly into said stage a), preferably after a simple topping of its lightest fraction, whose final point is generally between 50 and 250° C., and preferably between 100 and 200° C.

In the case where the treated feedstock in the process according to the invention is the fraction that is obtained from the atmospheric distillation of a crude oil, or a fraction called an atmospheric residue (RA), said process advantageously comprises an atmospheric distillation stage prior to the hydroconversion stage a).

In the case where the treated feedstock in the process according to the invention is the fraction that is obtained from the atmospheric and vacuum distillation of a crude oil, or a fraction that is called a vacuum residue (RSV), said process advantageously comprises an atmospheric distillation stage that is followed by a vacuum distillation stage prior to the hydroconversion stage a).

The stage a) for hydroconversion of said feedstock is generally implemented under conventional boiling bed hydroconversion conditions of a liquid hydrocarbon fraction. The procedure is usually performed under an absolute pressure of between 2 and 35 MPa, preferably between 5 and 25 MPa, and in a preferred manner between 6 and 20 MPa, at a temperature that is between 300 and 550° C. and preferably between 350 and 500° C. The hourly volumetric flow rate (VVH) and the partial hydrogen pressure are important factors that are selected based on the characteristics of the product to be treated and the desired conversion. Preferably, the VVH is between $0.1\ h^{-1}$ and $10\ h^{-1}$ and in a preferred manner between $0.15\ h^{-1}$ and $5\ h^{-1}$. The amount of hydrogen mixed with the feedstock is preferably between 50 and 5,000 normal cubic meters ($Nm^3$) per cubic meter ($m^3$) of liquid feedstock and in a preferred manner between 100 and 2,000 $Nm^3/m^3$ and in a very preferred manner between 200 and 1,000 $Nm^3/m^3$.

The hydroconversion catalyst used in stage a) of the process according to the invention is advantageously a granular catalyst with a size on the order of 1 mm. The catalyst is most often in the form of extrudates or balls. Typically, the catalyst comprises a substrate, whose pore distribution is adapted to the treatment of the feedstock, preferably amorphous and in a very preferred manner alumina, with a silica-alumina substrate also able to be considered in some cases and at least one metal of group VIII that is selected from among nickel and cobalt and preferably nickel, whereby said element of group VIII is preferably used in combination with at least one metal of group VIB that is selected from among molybdenum and tungsten, and preferably the metal of group VIB is molybdenum.

Preferably, the hydroconversion catalyst comprises nickel as an element of group VIII and molybdenum as an element of group VIB. The nickel content is advantageously between 0.5 and 15%, expressed in terms of weight of nickel oxide (NiO) and preferably between 1 to 10% by weight, and the molybdenum content is advantageously between 1 and 40%, expressed in terms of weight of molybdenum trioxide ($MoO_3$), and preferably between 4 and 20% by weight. Said catalyst can also advantageously contain phosphorus, whereby the phosphorus oxide content is preferably less than 20% by weight and preferably less than 10% by weight.

In accordance with the process according to the invention, the used hydroconversion catalyst can be partially replaced by fresh catalyst by drawing off, preferably at the bottom of the reactor and by introduction, either at the top or at the bottom of the reactor, fresh or regenerated or rejuvenated catalyst, preferably at a regular time interval and in a preferred manner in bursts or in an almost continuous way. The rate of replacement of the used hydroconversion catalyst by fresh catalyst is advantageously between 0.01 kilogram and 10 kilograms per cubic meter of treated feedstock, and preferably between 0.3 kilogram and 3 kilograms per cubic meter of treated feedstock. This drawing-off and this replacement are carried out using devices that advantageously make possible the continuous operation of this hydroconversion stage.

It is also advantageously possible to send the used catalyst that is drawn off from the reactor into a regeneration zone in which the carbon and the sulfur that it contains are eliminated and then to send this regenerated catalyst back into the hydroconversion stage a). It is also advantageously possible to send the used catalyst that is drawn off from the reactor into a rejuvenation zone in which the majority of the deposited metals are eliminated before the used and rejuvenated catalyst is sent into a regeneration zone in which the carbon and the sulfur that it contains are eliminated and then to send this regenerated catalyst back into the hydroconversion stage a).

The stage a) of the process according to the invention is advantageously implemented under the conditions of the H-Oil process as described in, for example, the U.S. Pat. No. 4,521,295 or U.S. Pat. No. 4,495,060 or U.S. Pat. No. 4,457,831 or U.S. Pat. No. 4,354,852 or in the article Aiche, Mar. 19-23, 1995, HOUSTON, Tex., paper number 46d, Second Generation Ebullated Bed Technology.

The hydroconversion catalyst that is used in the hydroconversion stage a) advantageously makes it possible to ensure both the demetallization and the desulfurization, under conditions that make it possible to obtain a liquid feedstock with a reduced content of metals, Conradson carbon and sulfur and that make it possible to obtain a strong conversion into light products, i.e., in particular into gasoline and gas oil fuel fractions.

Stage a) is advantageously implemented in one or more three-phase hydroconversion reactors. Each reactor advantageously comprises a recirculation pump that makes it possible to maintain the catalyst in a boiling bed by continuous recycling of at least one portion of a liquid fraction that is advantageously drawn off at the top of the reactor and reinjected at the bottom of the reactor.

The effluent that is obtained from the hydroconversion stage a) next undergoes—in accordance with stage b) of the process according to the invention—a separation stage for obtaining a light liquid fraction that boils at a temperature that is less than 300° C., preferably less than 350° C., and in a preferred manner, less than 375° C., and a heavy liquid fraction that boils at a temperature that is greater than 300° C., preferably greater than 350° C., and in a preferred manner greater than 375° C. This separation comprises any means of separation that is known by one skilled in the art, excluding atmospheric and vacuum distillations. Preferably, said separation stage b) is not an atmospheric and vacuum distillation. Preferably, this separation is implemented by one or more flash tanks in a series, and in a preferred manner by a concatenation of two successive flash tanks.

In the separation stage b), the conditions are selected so that the fraction point is 300° C., preferably 350° C., and in a preferred manner 375° C., so as to obtain two liquid fractions, a so-called light fraction, and a so-called heavy fraction.

The light fraction that is directly obtained at the output of the separation stage b) is then advantageously separated from light gases ($H_2$ and $C_1$-$C_4$) for obtaining the light liquid fraction that boils at a temperature that is less than 300° C., by any separation means known to one skilled in the art, such as, for example, by being run into a flash tank so as to recover the gaseous hydrogen that is advantageously recycled in the hydroconversion stage a).

The light liquid fraction, advantageously separated from said light gases and boiling at a temperature that is less than 300° C., preferably less than 350° C., and in a preferred manner less than 375° C., contains the dissolved light gases (C5+), a fraction boiling at a temperature that is less than 150° C. corresponding to naphthas, a fraction boiling between 150 and 250° C. corresponding to the kerosene fraction, and at least one portion of the gas oil fraction boiling between 250 and 375° C.

According to one embodiment, at least one portion of the light liquid fraction thus obtained and preferably all of it is advantageously sent into post-treatment units, such as, for example, a hydrotreatment and/or hydrocracking unit, for the purpose of incorporating it in the corresponding fuel pools.

The heavy liquid fraction that boils at a temperature that is greater than 300° C., preferably greater than 350° C., and in a preferred manner greater than 375° C. contains at least one portion of the gas oil fraction that boils between 250 and 375° C., a fraction that boils between 375 and 540° C., called a vacuum distillate, and a fraction that boils at a temperature that is greater than 540° C., called an unconverted vacuum residue. The heavy liquid fraction therefore advantageously comprises at least one portion of middle distillates and preferably at least one portion of the gas oil fraction that boils at a temperature that is between 250 and 375° C.

In accordance with stage c) of the process according to the invention, the heavy liquid fraction that boils at a temperature that is greater than 300° C., preferably greater than 350° C., and in a preferred manner greater than 375° C., next undergoes a deasphalting stage c), preferably without an atmospheric and preliminary intermediate vacuum distillation stage, for obtaining a deasphalted hydrocarbon fraction, called DAO, and residual asphalt.

The deasphalting stage using a solvent is carried out under conditions that are well known to one skilled in the art.

The deasphalting is generally implemented at a mean temperature that is between 60 and 250° C. with at least one hydrocarbon solvent that has 3 to 7 carbon atoms; the solvent is preferably butane, pentane or hexane, as well as their mixtures, optionally supplemented with at least one additive. The usable solvents and the additives are extensively described. It is also possible and advantageous to implement the recovery of the solvent according to the opticritical process, i.e., by using a solvent under non-supercritical conditions relative to the solvent-feedstock mixture in the separation section, but supercritical relative to the solvent alone. These separation conditions make it possible in particular to significantly enhance the overall economy of the process. This deasphalting can be done in one or more mixer-decanters or in one or more extraction columns.

Within the framework of this invention, the technique (for example, the Solvahl process) using at least one extraction column—and preferably only one—is preferred. Advantageously, as in the Solvahl process with a single extraction column, the solvent/feedstock ratios entering the deasphalting unit are small, between 4/1 and 6/1. The deasphalting unit produces a deasphalted hydrocarbon fraction DAO that is virtually free of C7 asphaltenes and a residual asphalt that concentrates the majority of the impurities of the residue, which is drawn off. The DAO yield can vary by less than 40% by weight to more than 90% by weight according to the operating conditions and the solvent that is used. The following table provides the ranges of typical operating conditions for the deasphalting based on the solvent:

| Solvent | Propane | Butane | Pentane | Hexane | Heptane |
| --- | --- | --- | --- | --- | --- |
| Pressure, MPa | 3-4 | 3-4 | 2-4 | 2-4 | 2-4 |
| Temperature, ° C. | 45-90 | 80-130 | 140-210 | 150-230 | 160-250 |
| Solvent/Feedstock Ratio, v/v | 6-10 | 5-8 | 3-6 | 3-6 | 3-5 |

The deasphalted hydrocarbon fraction DAO that is obtained preferably has a C7 asphaltene content that is less than 1% in general, with the measurement of the C7 asphaltene content being measured according to the Standard NFT60-115, preferably less than 0.5%, in a preferred manner less than 0.05% by weight measured in insoluble products in heptane, and in an even more preferred way less than 0.3% by weight measured in insoluble products in pentane and less than 0.05% by weight measured in insoluble products in heptane.

According to the invention, at least one portion of said deasphalted hydrocarbon fraction DAO that is obtained from stage c) is recycled upstream from the hydroconversion stage a) and mixed with the feedstock that is treated in the process according to the invention, consisting of crude oil or the heavy hydrocarbon fraction that is obtained from atmospheric and/or vacuum distillation of a crude oil, thus making it possible to supply the hydroconversion stage a) with a feedstock that has a reduced C7 asphaltene content relative to a hydroconversion unit without recycling the deasphalted hydrocarbon fraction DAO.

Actually, the deasphalted hydrocarbon fraction DAO that is obtained at the end of stage c) contains no or very few C7 asphaltenes, compounds that are known for inhibiting the conversion of residual fractions, both by their ability to form heavy hydrocarbon residues, commonly called coke, and by their tendency to produce sediments that greatly limit the operability of the hydrotreatment and hydroconversion units. As a result, it is possible to impose stricter operating conditions and thus to reach higher residual fraction conversion levels.

By recycling at least one portion of the deasphalted hydrocarbon fraction DAO that is obtained from stage c), the process according to the invention can, in certain embodiments that will be presented in detail below, make it possible to reach a net conversion that is greater than 85%, and preferably greater than 90%.

At least one portion and preferably the entire deasphalted hydrocarbon fraction DAO that is obtained from stage c) is recycled upstream from the hydroconversion stage a), optionally mixed with at least one portion and preferably the entire light liquid fraction that is obtained from stage b) and mixed with the feedstock treated in the process according to the invention.

The portion of the non-recycled deasphalted hydrocarbon fraction DAO upstream from the hydroconversion stage a) can advantageously be sent, optionally mixed with at least one portion and preferably the entire light liquid fraction that is obtained from stage b), in post-treatment units such as, for example, a hydrotreatment and/or hydrocracking or catalytic cracking unit.

The following embodiments are described by referring to the corresponding figures.

According to a first preferred embodiment of the process according to the invention shown in FIG. 1, the feedstock that is treated and introduced into the boiling bed hydroconversion stage a) via the pipe (1) is a vacuum residue (RSV) that is obtained from the atmospheric distillation (18) and vacuum distillation (23) of a crude oil prior to the hydroconversion stage a), which is converted in the presence of hydrogen (pipe (24)) in at least one three-phase reactor (2), with said reactor containing at least one hydroconversion catalyst and operating in a boiling bed, with upward flow of liquid and gas and comprising at least one means for drawing off said catalyst outside of said reactor, and at least one fresh catalyst make-up means in said reactor, under conditions that make it possible to obtain a liquid feedstock with a reduced content of Conradson carbon, metals, sulfur and nitrogen. The effluent that is obtained from the hydroconversion stage a) via the pipe (3)—in accordance with stage b) of the process according to the invention—next undergoes a separation stage in one or more flash tanks in a series (4) for obtaining a heavy liquid fraction that boils at a temperature that is greater than 375° C. via the pipe (6) and a light fraction via the pipe (25), whereby said light fraction is separated from the light gases ($H_2$ and $C_1$-$C_4$) by being run into a separator (17) that makes it possible to recover the hydrogen that is recycled in the hydroconversion stage a) via the pipe (24), preferably after purification and the addition of fresh hydrogen, and a light liquid fraction that boils at a temperature that is less than 375° C. via the pipe (26).

The light liquid fraction (26) that boils at a temperature that is less than 375° C. contains dissolved light gases, a fraction that boils at a temperature that is less than 150° C. corresponding to naphthas, a fraction that boils between 150 and 250° C. corresponding to the kerosene fraction, and at least one portion of the gas oil fraction that boils between 250 and 375° C. The entirety of said light liquid fraction that is thus obtained is advantageously sent, via the pipe (5), optionally mixed with the entire deasphalted hydrocarbon fraction DAO (pipe 8) to the primary atmospheric distillation column (18), either directly or after one or more pre-flash tanks upstream from said column (not shown in FIG. 1), at the end of which the following are recovered: the fractions of gas, gasoline (19), kerosene (20) and gas oil (21), as well as the atmospheric residue (22), which is next sent into the vacuum distillation column (23).

The heavy liquid fraction (6) that boils at a temperature that is greater than 375° C. contains a portion of the gas oil fraction that boils between 250 and 375° C., a fraction that boils between 375 and 540° C., called a vacuum distillate, and a fraction that boils at a temperature that is greater than 540° C., called an unconverted vacuum residue. In accordance with the process according to the invention, this heavy liquid fraction next undergoes a deasphalting stage c) in a deasphalting unit (7), without an atmospheric and/or preliminary intermediate vacuum distillation stage for obtaining a deasphalted hydrocarbon fraction, called DAO, in the pipe (8), and the residual asphalt in the pipe (16).

At least one portion and preferably the entirety of said deasphalted hydrocarbon fraction DAO that is obtained from stage c) is recycled. This deasphalted hydrocarbon fraction DAO can be sent in a mixture with the entirety of said light liquid fraction (26) upstream from the primary atmospheric distillation column via the pipe (5), either directly or after one or more pre-flash tanks upstream from said column (not shown in FIG. 1). In another embodiment (not shown in FIG. 1), said deasphalted hydrocarbon fraction DAO (8) is sent either upstream from the fractionation column under primary vacuum, or upstream from a second vacuum fractionation column (not shown in FIG. 1), which is in parallel with the primary vacuum column. This makes it possible to separate the deasphalted hydrocarbon fraction DAO into a light fraction, which will exit with the vacuum distillate(s) produced during the primary vacuum fractionation via the pipe (9) or during the vacuum fractionation in the second column (not shown in FIG. 1), and a heavy fraction, which will exit with the vacuum residue of the primary vacuum fractionation column via the pipe (1) or during the vacuum fractionation in the second column (not shown in FIG. 1), thus constituting a supply with a reduced C7 asphaltene content of the boiling bed hydroconversion stage a). The vacuum distillates that are obtained from primary vacuum fractionation and/or the second vacuum column contain the vacuum distillate that is present in the initial crude, and the light fraction of the deasphalted hydrocarbon fraction DAO. These vacuum distillates are next sent via the pipe (9), optionally in a mixture with a feedstock outside of the process of the invention (not shown in FIG. 1) that may or may not be after fractionation, into post-treatment units, such as, for example, a section for hydrotreatment (10) and/or catalytic cracking or catalytic hydrocracking (11), for example. The effluents that are produced are next advantageously fractionated so as to recover the fractions of gasoline (13), gas oil (14) and kerosene (15), either in a distillation column (12) or fractionated in the primary atmospheric distillation column (18) via the pipe (27). In this latter case, the fractions of gasolines, gas oils and kerosene respectively exit in the fluxes (19), (20) and (21).

Thus, according to this first embodiment, the feedstock that is treated and introduced into the hydroconversion stage a) is a vacuum residue that is obtained from the atmospheric and vacuum distillation of a crude oil prior to the hydroconversion stage a), and the entirety of said deasphalted hydrocarbon fraction DAO that is obtained from the deasphalting stage c) is recycled, either upstream from the primary atmospheric distillation column or upstream from the primary vacuum fractionation column or upstream from the second vacuum fractionation column.

This embodiment is particularly preferred for the applications for refining crude oils of any type for the purpose of producing fuels to the commercial specifications.

According to a second preferred embodiment of the process according to the invention, shown in FIG. 2, the feedstock that is treated and introduced into the boiling bed hydroconversion stage a) via the pipe (1) is a crude oil. The boiling bed hydroconversion unit (2) is directly supplied by the feedstock that consists of crude oil, whereby said crude oil has not undergone atmospheric distillation and/or vacuum distillation. In one variant of this embodiment, the crude oil undergoes a simple topping (not shown in FIG. 2) of its lightest fraction, whose final point is generally between 50 and 250° C., and preferably between 100 and 200° C.

The effluent that is obtained from stage a) via the pipe (3) undergoes a separation stage in one or more flash tanks in a series (4) to obtain a heavy liquid fraction that boils at a temperature that is greater than 300° C., preferably greater than 350° C., and in a preferred manner greater than 375° C., and a light fraction via the pipe (19), whereby said light fraction is separated from the light gases ($H_2$ and $C_1$-$C_4$) by running it over a separator (17) that makes it possible to recover the hydrogen that is recycled in the hydroconversion stage a) via the pipe (18), preferably after purification and addition of fresh hydrogen, and a light liquid fraction that boils at a temperature that is less than 300° C., preferably less than 350° C., and in a preferred manner less than 375° C.

In accordance with the process according to the invention, this heavy liquid fraction (6) next undergoes a deasphalting stage c) in a deasphalting unit (7) without an atmospheric and preliminary intermediate vacuum distillation stage to obtain a deasphalted hydrocarbon fraction, called DAO, in the pipe (8), and residual asphalt in the pipe (16).

At least one portion of the deasphalted hydrocarbon fraction DAO that is obtained from the deasphalting stage c) is recycled and sent via the pipe (8) directly into the input of the boiling bed hydroconversion stage a). The other portion of the deasphalted hydrocarbon fraction DAO that is obtained from stage c) and not recycled at the input of stage a) is advantageously sent via the pipe (9) in a mixture with the entire light liquid fraction that is obtained from stage b) of separation (5), optionally mixed with a feedstock that is outside of the process of the invention (not shown in FIG. 2), and optionally after fractionation or not, into one or more post-treatment units such as, for example, in a section for hydrotreatment (10) and/or catalytic cracking or catalytic hydrocracking (11). The effluent that is obtained from the post-treatment units is next advantageously fractionated in a distillation column (12) so as to recover the fractions of gasoline (13), gas oil (14) and kerosene (15).

According to this second embodiment, the feedstock that is treated and introduced into the hydroconversion stage a) is a crude oil that may or may not be topped, and at least one portion of the deasphalted hydrocarbon fraction DAO that is obtained from the deasphalting stage c) is recycled and sent directly to the input of the hydroconversion stage a).

This embodiment is particularly preferred for upgrading in the field of heavy and extra-heavy crude oils, such as, for example, in Venezuela, Canada, and Russia, for the purpose of obtaining a synthetic crude.

According to a third preferred embodiment of the process according to the invention shown in FIG. 3, the feedstock that is treated and introduced into the boiling bed hydroconversion stage a) via the pipe (1) is an atmospheric residue that is obtained from an atmospheric distillation stage (18) of a crude oil prior to the hydroconversion stage a). The effluent that is obtained from stage a) via the pipe (3) undergoes a separation stage in one or more flash tanks in a series (4) for obtaining a heavy liquid fraction that boils at a temperature that is greater than 300° C., preferably greater than 350° C., and in a preferred manner greater than 375° C., and a light fraction via the pipe (23), whereby said light fraction is separated from light gases ($H_2$ and $C_1$-$C_4$) by being run into a separator (17) that makes it possible to recover the hydrogen that is recycled in the hydroconversion stage a) via the pipe (22), preferably after purification and addition of fresh hydrogen, and a light liquid fraction that boils at a temperature that is less than 300° C., preferably less than 350° C., and in a preferred manner less than 375° C.

The entirety of said thus obtained light liquid fraction is sent, via the pipe (5), in a mixture with a portion of the deasphalted hydrocarbon fraction DAO to the primary atmospheric distillation column (18), at the end of which the fractions of gas, gasoline (19), kerosene (20) and gas oil (21) are recovered, as well as the atmospheric residue that constitutes the feedstock (pipe 1) of the hydroconversion unit (2). The heavy liquid fraction (6) next undergoes a deasphalting stage c) in a deasphalting unit (7), without an atmospheric and preliminary intermediate vacuum distillation stage, for obtaining a deasphalted hydrocarbon fraction, called DAO, in the pipe (8), and residual asphalt in the pipe (16). At least one portion of the deasphalted hydrocarbon fraction DAO is recycled upstream from the primary atmospheric distillation column via the pipe (5) in a mixture with the entire light liquid fraction that is obtained from the separation stage b) so that the latter can be collected with the fractions of gasoline (19), kerosene (20) and gas oil (21) of direct distillation called SR (from the English term "Straight Run"), which can next be sent, preferably in their entirety, which may or may not be after fractionation, to one or more post-treatment units. The other portion of the deasphalted hydrocarbon fraction DAO, not recycled at the input of stage a), is sent via the pipe (8), preferably in a mixture with a feedstock outside of the process of the invention (not shown in FIG. 3), into post-treatment units such as, for example, a section for hydrotreatment (10) and/or catalytic cracking or catalytic hydrocracking (11). Thus, according to this third embodiment, the feedstock that is treated and introduced in the hydroconversion stage a) is an atmospheric residue that is obtained from an atmospheric distillation stage of a crude oil prior to the hydroconversion stage a) and at least one portion of the deasphalted hydrocarbon fraction DAO is recycled upstream from the primary atmospheric distillation column via the pipe (5) in a mixture with at least one portion and preferably the entire light liquid fraction that is obtained from the separation stage b).

This embodiment is particularly preferred for the production of white crudes from conventional crudes, such as, for example, an Arabian Heavy.

The diagram according to the invention therefore proposes an intensified process that comprises two stages, one for boiling bed hydroconversion, the other for deasphalting with solvent, within the same unit reaction section, without an atmospheric and intermediate vacuum distillation stage, so as to increase the conversion by advantageously recycling the deasphalted hydrocarbon fraction DAO upstream from the boiling bed hydroconversion stage a), according to the different embodiments described above. The result is a substantial gain in performance levels, with the conversion being increased to values that are greater than 85%, and preferably greater than 90%, with the yields and qualities of light fraction products being enhanced.

Furthermore, the process according to the invention also makes it possible to realize savings in terms of initial investment, operating costs, and in particular the consumption of aromatic fluxing agent that is necessary for conveying the asphalt phase. This advanced scheme makes it possible in particular to enhance the vacuum distillate yield (DSV) by reduction of the asphalt fraction, as well as to reduce the initial investment and the operating cost of the process, in terms of consumption of fluxing agent. Furthermore, it makes it possible to enhance the quality of the products that are obtained, more particularly in terms of nitrogen and metals of the hydrotreated heavy fraction.

Figure 1:
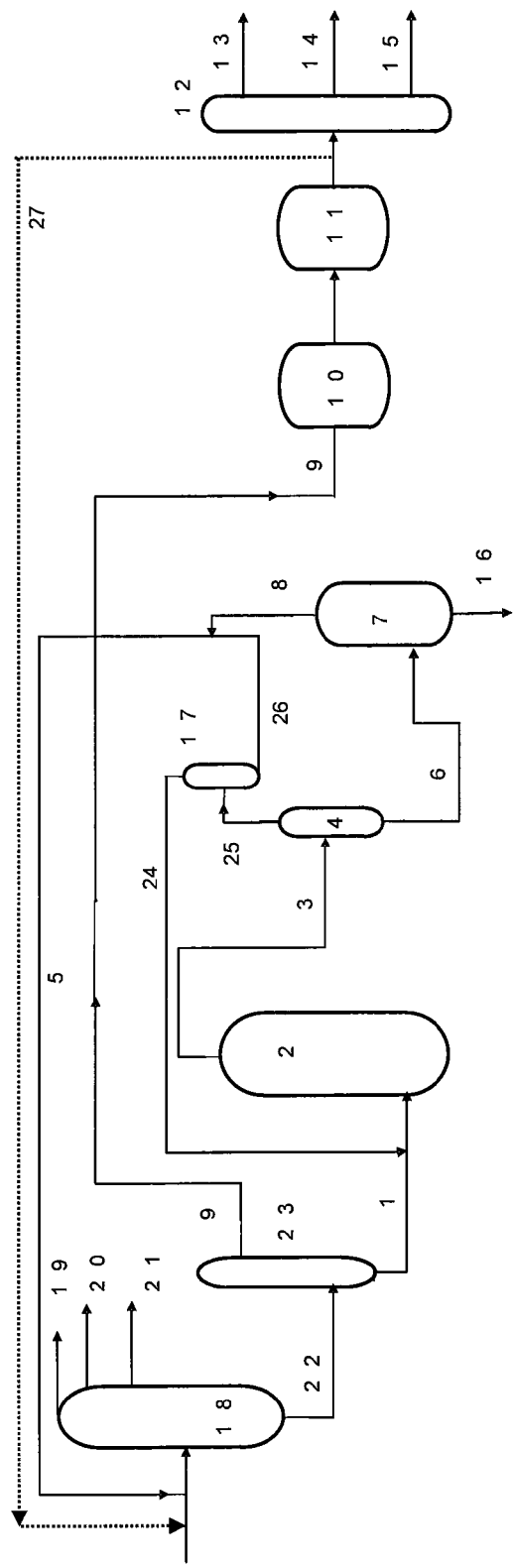
FIG. 1 illustrates the implementation of the process according to the first embodiment.
Figure 2:
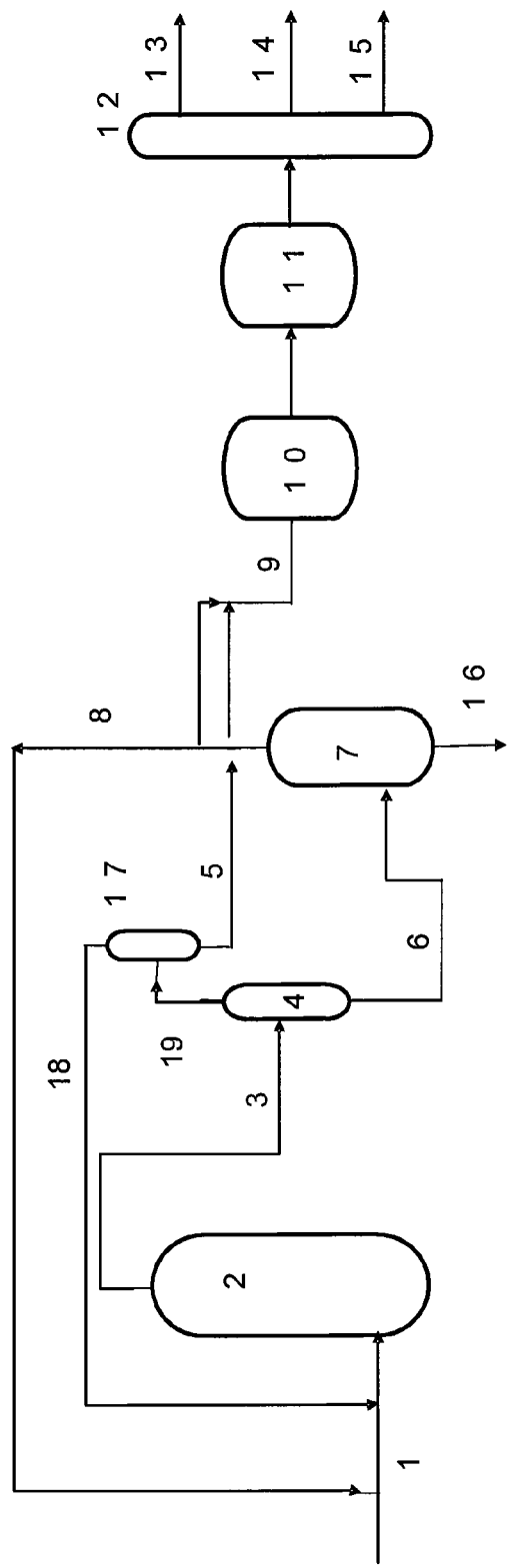
FIG. 2 illustrates the implementation of the process according to the second embodiment.
Figure 3:
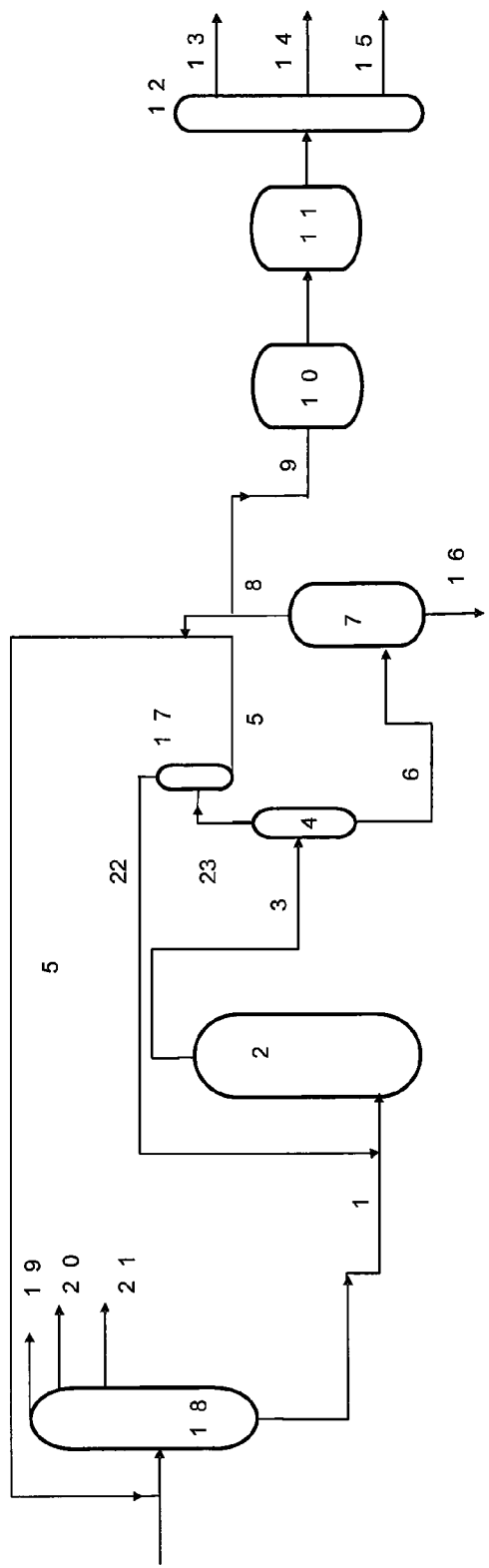
FIG. 3 illustrates the implementation of the process according to the third embodiment.

The following examples illustrate the invention without limiting its scope.

EXAMPLES

Comparison Example

An Athabasca crude, whose characteristics are provided in Table 1, undergoes an atmospheric distillation.

TABLE 1

Characteristics of an Athabasca Crude

|  |  | Athabasca Crude |
|---|---|---|
| Density 15/4 |  | 1.006 |
| Viscosity at 100° C. | cSt | 180 |
| Conradson Carbon | % by Weight | 11.5 |
| C7 Asphaltenes | % by Weight | 8 |
| C5 Asphaltenes | % by Weight | 14 |
| Nickel + Vanadium | ppm | 235 |
| Sulfur | % by Weight | 4.6 |
| Nitrogen | ppm | 4,160 |
| Content at 150-250° C. | % by Weight | 1.5 |
| Content at 250-375° C. | % by Weight | 16.8 |
| Content at 375-540° C. | % by Weight | 27.0 |
| Content at 540° C.+ | % by Weight | 54.7 |

The residue resulting from the atmospheric distillation of an Athabasca crude is vacuum distilled under conditions that make it possible to obtain a vacuum distillate called "Straight Run" (DSV SR) and a vacuum residue called "Straight Run" (RSV SR), whose primary characteristics are presented in Table 2 below.

TABLE 2

Composition of the Feedstock of the Boiling Bed Hydroconversion Unit

|  |  | Athabasca DSV SR | Athabasca RSV SR |
|---|---|---|---|
| Yield Relative to Crude | % by Weight | 27.0 | 54.7 |
| Density 15/4 |  | 0.988 | 1.05 |
| Viscosity at 100° C. | cSt | 19.8 | 12,600 |
| Conradson Carbon | % by Weight | 0.6 | 20.5 |
| C7 Asphaltenes | % by Weight | 0.03 | 14 |
| C5 Asphaltenes | % by Weight | 0.4 | 25 |
| Nickel + Vanadium | ppm | 3 | 432 |
| Sulfur | % by Weight | 4.15 | 5.72 |
| Nitrogen | ppm | 2,750 | 6,200 |

The RSV SR fraction is first mixed with the DAO C4 fraction before being sent in its entirety into a hydroconversion unit in the presence of hydrogen, whereby said section comprises at least one three-phase reactor that contains an NiMo/alumina hydroconversion catalyst that has an NiO content of 4.5% by weight and a content of $MoO_3$ of 10% by weight, whereby the percentages are expressed relative to the total mass of the catalyst. The section operates in a boiling bed that operates with an upward flow of liquid and gas. The unit comprises two reactors in a series and is equipped with an inter-stage separator.

The conditions that are applied in the hydroconversion unit are as follows:

$VVH_{reactor}=0.3$ $h^{-1}$ $P_{tot}=16$ MPa

T=420° C.

Quantity of hydrogen mixed with the feedstock in the first reactor=630 $Nm^3/m^3$ Quantity of hydrogen mixed with the feedstock in the second reactor=190 $Nm^3/m^3$ These operating conditions make it possible to obtain a liquid effluent with a reduced content of Conradson carbon, metals and sulfur. The hydroconverted liquid effluent is next sent into an atmospheric and intermediate vacuum distillation zone following which a vacuum distillate fraction is recovered that boils at a temperature that is between 375 and 540° C. (DSV LB) and a vacuum residue fraction that boils at a temperature that is greater than 540° C. (RSV LB) whose yields and qualities of products are provided in Table 3 below.

TABLE 3

Yields and Qualities of Products of Heavy Products Originating from the Boiling Bed (LB)

|  |  | DSV LB (375-540° C.) | RSV LB (540° C.+) |
|---|---|---|---|
| Yield Relative to RSV SR | % by Weight | 33.9 | 33.1 |
| Yield Relative to Crude | % by Weight | 18.5 | 17.0 |
| Density 15/4 |  | 0.947 | 1.030 |
| Viscosity at 100° C. | cSt | 12.7 | 1,600 |
| Conradson Carbon | % by Weight | 1.2 | 13.4 |
| C7 Asphaltenes | % by Weight | <500 ppm | 5.1 |
| Nickel + Vanadium | ppm | <2 | 69 |
| Sulfur | % by Weight | 0.46 | 0.71 |
| Nitrogen | ppm | 3,500 | 6,300 |

The net conversion of the 540° C.+ fraction of the feedstock is 68% by weight per pass. The vacuum residue (RSV)

that is obtained from the distillation zone is next advantageously sent into a deasphalting section in which it is treated in an extractor using the butane solvent under deasphalting conditions that are known to one skilled in the art making it possible to obtain a deasphalted hydrocarbon fraction, called DAO, and residual asphalt.

The conditions that are applied in the deasphalting unit are as follows:

Solvent: butane $P_{tot}$=3 MPa $T_{means}$=95° C.

Solvent/feedstock ratio=8 v/v

At the output of deasphalting, a deasphalted hydrocarbon fraction (DAO) and an asphalt are obtained. The deasphalted hydrocarbon fraction (DAO) and the asphalt have the following characteristics:

TABLE 4

Composition of DAO and the Asphalt

| | | DAO | Asphalt |
|---|---|---|---|
| SDA Yield | % by Weight | 53.3 | 46.7 |
| Yield Relative to Crude | % by Weight | 9.7 | 8.5 |
| Density 15/4 | | 0.989 | 1.082 |
| Ball & Ring | ° C. | — | 183 |
| Viscosity at 100° C. | cSt | 155 | — |
| Conradson Carbon | % by Weight | 3.2 | 25.0 |
| C7 Asphaltenes | % by Weight | 0.05 | — |
| Nickel + Vanadium | ppm | <2 | 146 |
| Sulfur | % by Weight | 0.52 | 0.93 |
| Nitrogen | ppm | 3,300 | 9,700 |

The entire DAO C4 is next recycled and mixed with the RSV SR Athabasca feedstock, with the mixture next being sent to the boiling bed hydroconversion stage. This concatenation therefore makes it possible to obtain 2 heavy fractions at the output, a single conversion fraction DSV (DSV LB) and an asphalt fraction. The characteristics of these 2 fractions are provided in Tables 3 and 4. The overall conversion of the 540° C.+ fraction is therefore 82% by weight relative to the RSV SR Athabasca feedstock.

The vacuum distillate fraction (DSV LB) can next be sent to a post-treatment unit, such as a hydrotreatment unit followed by a hydrocracking unit under conditions that make it possible to reduce in particular its content of metals, sulfur and Conradson carbon and to obtain—after a new separation by atmospheric distillation—a gaseous fraction, an atmospheric distillate that can be split into a gasoline fraction and a gas oil fraction, and a heavier fraction called an atmospheric residue. It is also possible to treat all of the DSV fractions (DSV SR+DSV LB). In this case, it is the DSV SR+DSV LB mixture whose composition is also provided in Table 8, which is sent to a post-treatment unit, such as a hydrotreatment unit followed by a hydrocracking unit under conditions that make it possible to reduce in particular its content of metals, sulfur and Conradson carbon and to obtain—after a new separation by atmospheric distillation—a gaseous fraction, an atmospheric distillate that it is possible to split into a gasoline fraction and a gas oil fraction, and a heavier fraction that is called atmospheric residue.

TABLE 5

Composition of the DSV LB + DSV SR Mixture

| | | DSV SR + DSV LB |
|---|---|---|
| Yield Relative to Crude | % by Weight | 45.5 |
| Density 15/4 | | 0.971 |
| Viscosity at 100° C. | cSt | 16.4 |
| Conradson Carbon | % by Weight | 0.9 |
| C7 Asphaltenes | % by Weight | <500 ppm |
| Nickel + Vanadium | ppm | 2 |
| Sulfur | % by Weight | 2.65 |
| Nitrogen | ppm | 3,100 |

Furthermore, so as to be able to transport asphalt, it is necessary to reduce the viscosity of this fraction in a very significant way. To do this, an aromatic fraction called a fluxing agent is generally added. Among the fluxing agents, the gas oil fraction LCO that is obtained from a catalytic cracking unit is the most used. So as to reduce the viscosity of the asphalt at 250° C. up to 300 cSt, it is necessary to add 19% by mass of LCO relative to the asphalt, which represents 1.6 tons of LCO relative to 100 tons of treated Athabasca crude.

Example According to the Invention

According to the invention, the DAO fraction that is produced is sent into the primary distillation column so as to remove the light fractions. The heaviest fractions are sent with the atmospheric residue of the Athabasca crude described in Table 1 into the primary vacuum distillation column. The latter therefore produces a DSV fraction, which contains the DSV SR that is present in the initial Athabasca crude, as well as the 540° C.− fraction of the DAO fraction produced in the deasphalting unit. The primary vacuum distillation column also produces a vacuum residue RSV, which contains the RSV SR that is present in the initial Athabasca crude, as well as the 540° C.+ fraction of the DAO fraction produced in the deasphalting unit.

This vacuum residue that is obtained from the primary vacuum distillation column is therefore the feedstock of the boiling bed hydroconversion unit. This feedstock is sent in its entirety into a hydroconversion unit in the presence of hydrogen, whereby said section comprises at least one three-phase reactor that contains an NiMo/alumina hydroconversion catalyst that has an NiO content of 4.5% by weight and an MoO$_3$ content of 10% by weight, whereby the percentages are expressed relative to the total mass of the catalyst. The section operates in a boiling bed that operates with an upward flow of liquid and gas. The unit comprises two reactors in a series and is equipped with an inter-stage separator.

The conditions that are applied in the hydroconversion unit are as follows:

$VVH_{reactor}$=0.3 h$^{-1}$ $P_{tot}$=16 MPa

T=420° C.

Recycling of hydrogen to the first reactor=630 lH$_2$/l of feedstock

Recycling of hydrogen to the second reactor=190 lH$_2$/l of feedstock

These operating conditions make it possible to obtain a liquid effluent with a reduced content of Conradson carbon, metals and sulfur. The hydroconverted liquid effluent is next sent into a separation zone that consists of two flash tanks in a series for obtaining a light liquid fraction that boils at a temperature that is less than 375° C., separated from light gases, and a heavy liquid fraction that boils at a temperature that is greater than 375° C.

The heavy fraction that boils at a temperature that is greater than 375° C. contains a portion of the gas oil fraction that boils between 250 and 375° C., a fraction that boils between 375 and 540° C. that is called vacuum distillate (DSV), and a fraction that boils at a temperature that is greater than 540° C. that is called vacuum residue (RSV). The properties of the heavy fraction that boils at a temperature that is greater than 375° C. are presented in Table 6 below.

TABLE 6

Composition of the Heavy Fraction that Boils at a Temperature that is Greater than 375° C.

|  |  | Heavy Fraction (375° C.+) |
|---|---|---|
| Yield Relative to Crude | % by Weight | 37.5 |
| Density |  | 0.982 |
| Viscosity at 100° C. | cSt | 57.7 |
| Conradson Carbon | % by Weight | 6.7 |
| C7 Asphaltenes | % by Weight | 2.3 |
| Nickel + Vanadium | ppm | 32 |
| Sulfur | % by Weight | 0.55 |
| Nitrogen | ppm | 4,600 |

The entire heavy liquid fraction that boils at a temperature that is greater than 375° C. that is obtained from the separation stage is deasphalted, without an atmospheric distillation stage and under intermediate vacuum, to obtain a deasphalted hydrocarbon fraction, called DAO, and residual asphalt. Since this fraction is much lighter than the RSV that is conventionally obtained, deasphalting can be done by using a heavier solvent and by toughening the operating conditions. The use of pentane as solvent therefore becomes possible.

The conditions applied in the deasphalting unit are as follows:

Solvent: pentane
$P_{tot}$=3 MPa
$T_{mean}$=160° C.
Solvent/feedstock ratio=8 v/v At the output of deasphalting, a deasphalted hydrocarbon fraction (DAO C5) and an asphalt are obtained. The deasphalted hydrocarbon fraction (DAO C5) and the asphalt have the following characteristics:

TABLE 7

Composition of the DAO C5 Fraction and Asphalt

|  |  | DAO C5 | Asphalt |
|---|---|---|---|
| SDA Yield | % by Weight | 81.5 | 18.5 |
| Yield Relative to Crude | % by Weight | 30.6 | 6.9 |
| Density 15/4 |  | 0.974 | 1.015 |
| Ball & Ring | ° C. | — | 178 |
| Viscosity at 100° C. | cSt | 21.0 | — |
| Conradson Carbon | % by Weight | 2.3 | 25.9 |
| C7 Asphaltenes | % by Weight | 0.06 | — |
| Nickel + Vanadium | ppm | 3 | 163 |
| Sulfur | % by Weight | 0.38 | 1.27 |
| Nitrogen | ppm | 3,000 | 11,400 |

So as to be able to transport the asphalt, it is necessary to reduce—in a very significant way—the viscosity of this fraction. To do this, an aromatic fraction called a fluxing agent is generally added. Among the fluxing agents, the gas oil fraction LCO that is obtained from a catalytic cracking unit is the most used. So as to reduce the viscosity of the asphalt at 250° C. up to 300 cSt, it is necessary to add 16% by mass of LCO relative to the asphalt, which represents 1.1 tons of LCO relative to 100 tons of treated initial Athabasca crude.

The entire DAO is next recycled in a mixture with the entirety of said light liquid fraction that boils at a temperature that is less than 375° C. upstream from the hydroconversion stage, i.e., upstream from the primary atmospheric distillation column, at the end of which the fractions of gas, naphtha, kerosene and gas oil are recovered, as well as the atmospheric residue that is next sent into the vacuum distillation column. At the end of the vacuum distillation column, a vacuum residue fraction (RSV) that constitutes the feedstock of stage a) and a vacuum distillate fraction (DSV) that boils between 375 and 540° C. are obtained. This configuration makes it possible to separate the deasphalted hydrocarbon fraction DAO C5 into a light fraction, which will exist with the vacuum distillate(s) produced during the primary vacuum fractionation, and a heavy fraction that will exit with the vacuum residue of the primary vacuum fractionation column, thus constituting a supply with a reduced C7 asphaltene content of the boiling bed hydroconversion stage a). In this concatenation, the overall conversion of the 540° C.+ fraction is 88% by weight relative to the RSV SR Athabasca feedstock.

The vacuum distillate DSV that is obtained from the primary vacuum fractionation therefore contains the vacuum distillate that is present in the initial Athabasca crude and the light fraction of the deasphalted hydrocarbon fraction DAO C5. This vacuum distillate fraction DSV that is obtained from the primary vacuum fractionation, whose composition is provided in Table 8, is next sent into post-treatment units, such as, for example, a hydrotreatment and/or catalytic cracking or catalytic hydrocracking section. In particular, the vacuum distillate fraction DSV that is obtained from primary vacuum fractionation is sent to a post-treatment unit, such as a hydrotreatment unit that is followed by a hydrocracking unit under conditions that make it possible to reduce in particular its content of metals, sulfur and Conradson carbon and to obtain—after a new separation by atmospheric distillation—a gaseous fraction, an atmospheric distillate that it is possible to split into a gasoline fraction and a gas oil fraction and a heavier fraction that is called atmospheric residue.

The composition of the vacuum distillate fraction DSV that is obtained from primary vacuum fractionation is provided in Table 8.

TABLE 8

Composition of the DSV Fraction

|  |  | DSV |
|---|---|---|
| Yield Relative to Crude | % by Weight | 47.1 |
| Density 15/4 |  | 0.980 |
| Viscosity at 100° C. | cSt | 16.9 |
| Conradson Carbon | % by Weight | 1.1 |
| C7 Asphaltenes | % by Weight | <500 ppm |
| Nickel + Vanadium | ppm | 2 |
| Sulfur | % by Weight | 2.51 |
| Nitrogen | ppm | 2,800 |

The thus obtained DSV fraction represents a purified fraction with an overall yield of 47.1% by weight relative to the initiator Athabasca crude. This fraction can next be sent to a post-treatment unit, such as a catalytic cracking unit or a hydrocracking unit. Preferably, the deasphalted oil that is obtained next undergoes a hydrotreatment stage followed by a hydrocracking stage in a fixed bed under conditions that make it possible to reduce in particular its content of metals, sulfur and Conradson carbon and to obtain—after a new separation by atmospheric distillation—a gaseous fraction, an atmospheric distillate that it is possible to split into a gasoline fraction and a gas oil fraction and a heavier fraction called an atmospheric residue.

The advantages of the process according to the invention are therefore multiple: first of all, the process of the invention prepares a larger quantity of a heavy fraction that can next be treated by a post-treatment process of hydrotreatment and/or fixed-bed hydrocracking and/or catalytic cracking type. Actually, relative to a conventional concatenation of a boiling bed hydroconversion unit with a deasphalting unit, the yield of this heavy fraction that is produced is 47.1% by weight relative to the initial Athabasca crude from the start instead of 45.5% by weight relative to the Athabasca vacuum residue from the start, or a relative increase of the yield of 3.5%. In addition, the qualities of this heavy fraction that is produced are similar to or better than those obtained by the mixing of DSV SR, DSV LB, and the DAO fraction in the conventional concatenation. Actually, the same density, viscosity, content of metals, content of Conradson carbon and C7 asphaltene content are obtained, but there is a lower content of sulfur and primarily a lower content of nitrogen, which goes from 3,100 ppm to 2,800 ppm. This latter property is actually very significant and restrictive for the post-treatment processes downstream, such as fixed-bed hydrocracking and catalytic cracking. Secondly, the initial investment is also reduced since the intermediate atmospheric distillation stage and the intermediate vacuum distillation stage that are implemented between these two units have been replaced by less sophisticated unit operations, leading to a reduction of the number of pieces of equipment. The use of the primary atmospheric distillation column and the primary vacuum distillation column nevertheless makes it possible to obtain the different upgradable fractions. Thermal integration can also be enhanced by optimizing the exchanger network. Finally, the operating cost of the process has also been reduced in terms of consumption of the fluxing agent that is necessary for the transport of the asphalt. Actually, in the example according to the invention, only 1.1% by mass of LCO relative to the initial Athabasca crude at the start is necessary instead of 1.5% by mass of LCO relative to the initial Athabasca crude at the start in the case of the conventional concatenation, or a reduction of 26% of the consumption of the fluxing agent.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 10/03.561, filed 7 Sep. 2011, and FR application No. 10/03.836, filed 28 Sep. 2011 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for conversion of a feedstock containing crude oil or of a heavy hydrocarbon fraction that is obtained from atmospheric and/or vacuum distillation of a crude oil and that has an initial boiling point of at least 300° C., said process comprising:
   a) hydroconverting of at least one portion of said feedstock in the presence of hydrogen in at least one three-phase reactor, whereby said reactor contains at least one hydroconversion catalyst and operates in a boiling bed, with an upward flow of liquid and gas, and comprises at least one line capable of drawing off said catalyst outside of said reactor and at least one fresh catalyst make-up line in said reactor, under conditions that make it possible to obtain a liquid feedstock with a reduced content of Conradson carbon, metals, sulfur and nitrogen,
   b) separating of the effluent that is obtained from a) obtaining a light liquid fraction that boils at a temperature that is less than 300° C. and a heavy liquid fraction that boils at a temperature that is greater than 300° C.,
   c) deasphalting of at least one portion of the heavy liquid fraction that boils at a temperature that is greater than 300° C. obtained from b) obtaining a deasphalted hydrocarbon fraction and residual asphalt,
said process being conducted without an intermediate atmospheric or vacuum distillation stage,
   d) recycling of at least one portion of deasphalted hydrocarbon that is obtained from c) and mixing with said feedstock upstream from the hydroconversion a).

2. The process according to claim 1, in which the heavy hydrocarbon fraction consists of vacuum residues that have a sulfur content of at least 0.5% by weight, a Conradson carbon content of at least 5% by weight, a C7 asphaltene content of at least 1% by weight, and a metal content of at least 20 ppm.

3. The process according to claim 1, in which the hydroconversion a) operates under an absolute pressure of between 2 and 35 MPa, at a temperature that is between 300 and 550° C., at an hourly volumetric flow rate (VVH) of between 0.1 $h^{-1}$ and 10 $h^{-1}$, and—under a quantity of hydrogen that is mixed with the feedstock—is preferably between 50 and 5,000 normal cubic meters ($Nm^3$) per cubic meter ($m^3$) of liquid feedstock.

4. The process according to claim 1, in which the hydroconversion catalyst is a catalyst that comprises an alumina substrate and at least one metal of group VIII that is nickel or cobalt, whereby said metal of group VIII is used in association with at least one metal of group VIB that is molybdenum or tungsten.

5. The process according to claim 1, in which the effluent that is obtained from stage a) undergoes a separation stage for obtaining a light liquid fraction that boils at a temperature that is less than 350° C. and a heavy liquid fraction that boils at a temperature that is greater than 350° C.

6. The process according to claim 5, in which effluent that is obtained from a) undergoes a separation obtaining a light liquid fraction that boils at a temperature that is less than 375° C. and a heavy liquid fraction that boils at a temperature that is greater than 375° C.

7. The process according to claim 1, in which at least one portion of the deasphalted hydrocarbon fraction DAO that is obtained from c) is recycled upstream from hydroconversion a), mixed with at least one portion of light liquid fraction that is obtained from b), and mixed with the feedstock.

8. The process according to claim 1, in which a portion of deasphalted hydrocarbon fraction that is not recycled upstream from the hydroconversion a) is sent, mixed with at least one portion of light liquid fraction that is obtained from b), into post-treatment units.

9. The process according to claim 1, in which the feedstock that is introduced into the hydroconversion a) is a vacuum residue that is obtained from atmospheric and vacuum distillation of a crude oil prior to the hydroconversion a), and the entirety of said deasphalted hydrocarbon fraction that is obtained from deasphalting c) is recycled, either upstream from a primary atmospheric distillation column or upstream from a primary vacuum fractionation column.

10. The process according to claim 1, in which the feedstock that is introduced into the hydroconversion a) is a crude oil, and at least one portion of the deasphalted hydrocarbon fraction that is obtained from deasphalting c) is recycled and sent directly to the input of the hydroconversion a).

11. The process according to claim 1, in which the feedstock that is introduced into the hydroconversion a) is an atmospheric residue that is obtained from an atmospheric distillation stage of a crude oil prior to the hydroconversion a), and at least one portion of the deasphalted hydrocarbon fraction is recycled upstream from a primary atmospheric distillation column, in a mixture with at least one portion of light liquid fraction that is obtained from separation b).

12. The process according to claim 11, wherein the entire light liquid fraction is recycled in a mixture with the deasphalted hydrocarbon fraction.

13. The process according to claim 1, wherein a, b and c are conducted in the same unit reaction section.

* * * * *